UNITED STATES PATENT OFFICE.

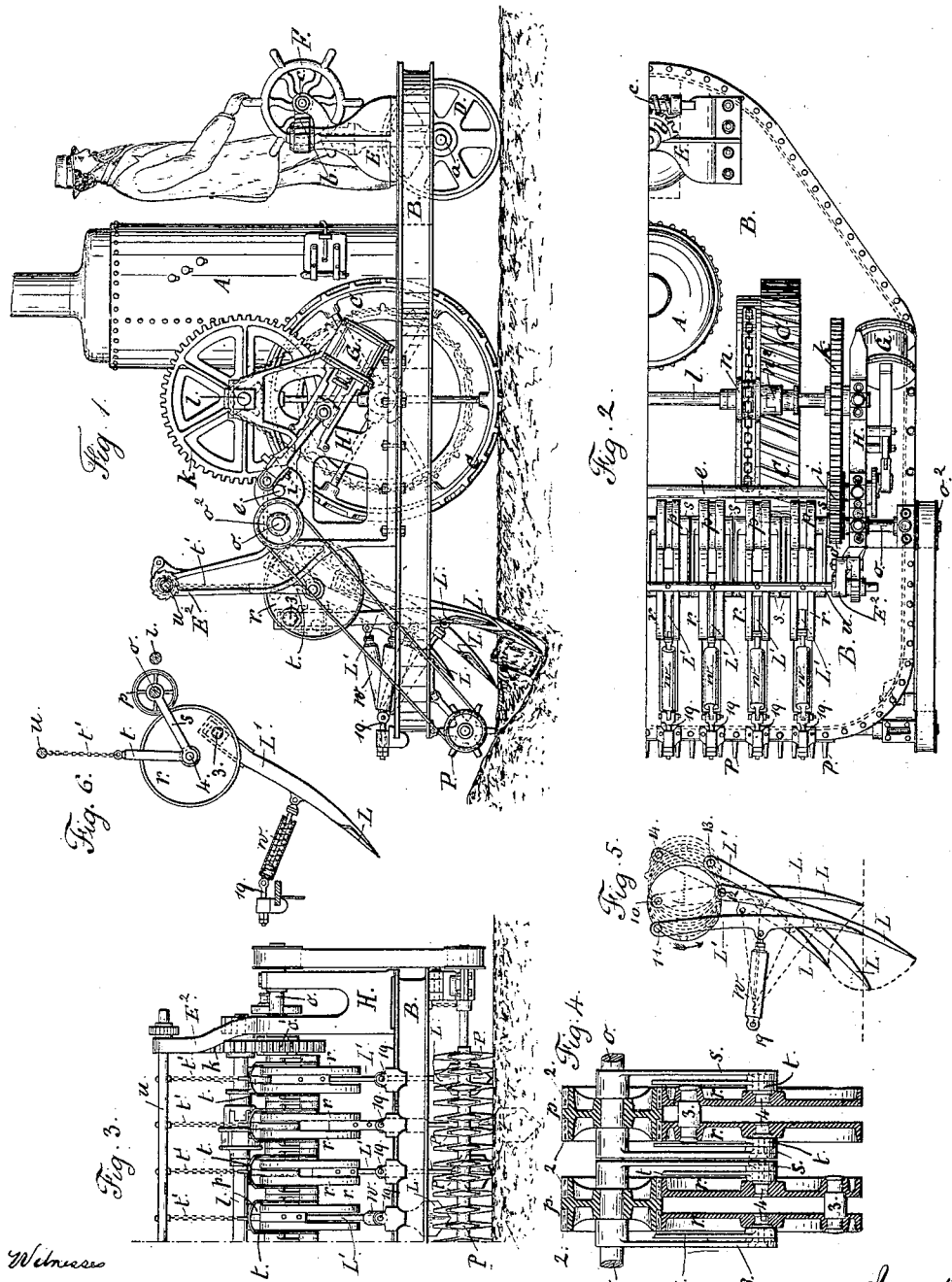

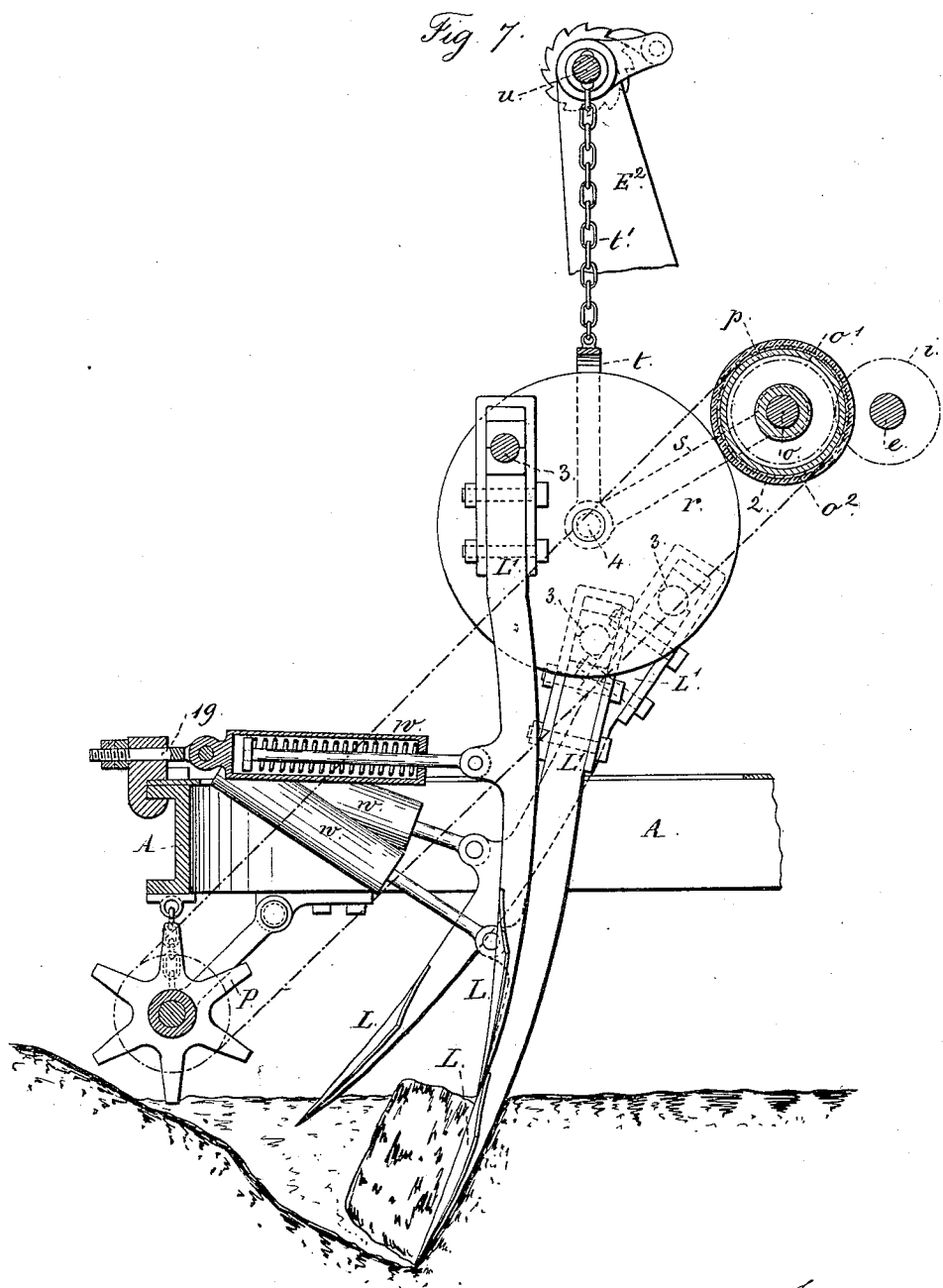

ROY STONE, OF NEW YORK, N. Y.

STEAM-PLOW.

SPECIFICATION forming part of Letters Patent No. 265,345, dated October 3, 1882.

Application filed January 16, 1882. (No model.)

*To all whom it may concern:*

Be it known that I, ROY STONE, of the city, county, and State of New York, have invented an Improvement in Steam-Plows, of which the following is a specification.

This invention relates to that class of plows in which the earth is pulverized by the action of spades that enter the earth and pry up and separate the same in a manner similar to spading by hand.

I employ a range of spades with spring-links hinged to the handles near the tops of the blades, and crank-disks acting upon the upper ends of the handles. These crank-disks are driven preferably by frictional contact with wheels, though gear-wheels may be used instead, there being links that connect the respective shafts so as to keep the surfaces firmly in contact and allow the crank-disks to rise and fall, as necessary in digging, each spade being free to penetrate the earth as deep as the force exerted will cause it to, and in cases where the spade comes in contact with a stone, a root, or other hard substance the crank-disks will rise upon the handle of the spade instead of the spade being forced into the earth. By this means the mechanism is protected from injury and the spades adapted to the circumstances under which they have to be used.

In the drawings, Figure 1 is a side view of the steam-plow. Fig. 2 is a plan of half of the steam-plow. Fig. 3 is a rear view of a portion of the spades and their actuating devices. Fig. 4 is a section in larger size of two of the pairs of crank-disks and their driving-pulleys. Fig. 5 is a diagram of the different positions assumed by the spade in its movements. Fig. 6 is a separate side elevation of one of the crank-disks and driving-pulley; and Fig. 7 is a section in larger size through the actuating-shaft, showing three of the spades.

The boiler A is upon a platform, B.

C is one of the supporting and driving wheels, there being two such wheels, one at each side of the machine, with bearings for the axles of the wheels upon the frame A; and D is a steering-wheel in a jaw, $a$, that is provided with a vertical shaft in the frame E, and to the upper end of this shaft the segmental wheel $b$ is connected, and there is a horizontal shaft and worm-pinion, $c$, rotated by a hand-wheel, F, so that the attendant can turn the wheel D and steer the plow thereby.

A steam-engine cylinder, G, is applied at one or both sides of the machine. It is upon the frame-work H, and it is connected by a steam-pipe with the boiler, and provided with any known valves and stopping and starting mechanism, which do not require to be described in detail.

The engine revolves the driving-shaft $e$, upon which is a pinion, $i$, gearing to the wheel $k$ upon the cross-shaft $l$, which has its journal-boxes in the upper part of the frame-work H. Upon this shaft $l$ there are two chain-pinions, $n$, with endless chains that pass around skeleton wheels at the sides of the main driving-wheels C, so as to give a gradual movement to these wheels and propel the machine at the required speed in order that the proper thickness of earth may be cut out each spadeful. This chain-gearing is not liable to become clogged with earth or injured by any substance falling upon it. The edges of the driving-wheels are roughened by ribs or flanges extending across the faces diagonally, so as to prevent the wheels slipping on the surface of the earth.

The shaft $o$ is driven by a pinion, $o'$, that gears into the pinion $i$, and this shaft is in bearings upon the frame H, and it is provided with friction-wheels $p$, keyed or otherwise secured firmly to the shaft. There are as many of these friction-wheels as there are spades. I will therefore describe one spade and its accompanying device, and remark that they are all alike, and that there may be any desired number of spades in the gang. The surfaces of the friction-wheels $p$ are by preference covered with leather, rubber, or similar material, as shown at 2 2, so that they act more reliably in driving the crank-disks $r$ by frictional contact. These crank-disks $r$ are in pairs, one pair to each spade. There is a crank-pin, 3, connecting them together. Each disk has a central pin, 4, on the outer side, and $s$ $s$ are links that have eyes in their ends. One eye of each link surrounds the shaft $o$, and the links and disks can swing thereon. The other eye receives the central pin, 4, of its disk $r$, and the lengths of the links are such that the peripheries of the disks are held in contact with the friction-wheel $p$, so as to be turned thereby, and at the same time the links can swing on the shaft $o$ as a center as the wheels $r$ may rise or fall.

In order to limit the downward movement of the crank-disks, and by consequence the depth to which the spades penetrate, I make use of a bail, $t$, that straddles its pair of disks, and the eyes at the lower ends of the bail surround the central pins, 4, of the cam-disks between the links and the disks, and to this bail there is a chain, $t'$, that passes to the winding-up shaft $u$, having a ratchet-wheel and pawl at one end, so that the bails may be raised or lowered by turning the shaft $u$, and the spades L, that are suspended by their handle from the crank-pins 3, are allowed to penetrate the earth more or less, according to the adjustments of the bails by their chains and shaft $u$. The shaft $u$ is supported by the projecting frames $E^2$, and I remark that in place of bails there may be chains to eyes at the top parts of the link, near the outer ends; or the bails may be hinged to such links instead of having eyes for the studs 4.

Each spade L is provided with a handle, $L'$, at the upper end of which is an eye for the crank-pin 3 to pass through, and upon the handle there is a joint near the top of the blade, to which is connected the spring-link $w$, and this is hinged to the adjusting-bolt 19, passing through a clip on the bed of the machine to adjust the tension of the spring. I prefer and use helical springs within the tubular links, there being rods passing through the springs and nuts or heads at the inner ends to act upon the springs. One of these spring-links is shown sectionally in Figs. 6 and 7.

Upon reference to the diagram Fig. 5 it will be seen that when the point of the spade touches the earth the spring-link is not distended. The handle is nearly vertical, the parts being in the positions marked 11. The crank-disk is moving in the direction denoted by the arrow and forces the spade down into the earth to the position 12. Then the spring-link is under considerable tension, the movement of the machine forward, and the rapid forward movement of the top of the handle at this moment causes the handle to act as a pry to loosen the spadeful of earth and inclines the spade, and as soon as the earth is sufficiently loose the spring-link becomes a retractor and throws the spadeful of earth backwardly, delivering it from the spade, and causing it to fall upon the rotary separator or pulverizer P, that is driven by a band or other convenient means from the pulley $o^2$ on the shaft $o$. The parts at this time are in the positions marked 13. The further revolution of the crank-disks draws the spade up above the earth to the inclined position 14, and then brings the handle vertical, or nearly so, to the position marked 10, ready to be again thrust into the earth, the tubular link acting as a radius-bar to carry the point of the spade to its proper place. If, however, the spade rests upon an obstruction that it will not penetrate, the cam-disks continue to revolve, the crank-pin 3 becomes a fulcrum on which the disks of that crank-pin lift as the parts continue to revolve, the links $s$ swinging upon their shaft $o$, and the crank-pin again acts upon the handle, lifts it and the spade, and then the spade is thrust down into the ground in another place at the next movement. By slipping the coupling $n^2$ the engine will be disconnected from the main driving-wheels and the spades will act as the propelling devices as they strike into the earth in advance of the place where they draw out.

There may be a coupling to disconnect the spades from the engine, so that the former may be drawn up by the bails and shaft $u$ and remain stationary while going to the field.

I claim as my invention—

1. In a spading-machine, a driving-shaft, $o$, with wheels $p$ thereon, a range of spades, L L', an independent crank, 3, and its disk $r$ to each spade, and links $s$ to connect the driving-shaft $o$ with the axes of the independent actuating-disks, substantially as set forth.

2. The combination, with a spade, L, and its handle, L', of a pair of disks, $r$, with a crank-pin, 3, between them, an actuating-shaft, $o$, with friction-wheels $p$ $r$, and connecting-links $s$, between the actuating-shaft and the axes of the disks, substantially as set forth.

3. In a steam-plow, the combination, with the spade and handle, of a crank, 3, to actuate the same, and an extension spring-link, $w$, between the handle and the frame, constructed to act as a retractor and radius-bar, for the purposes and as set forth.

4. The shaft $o$ and friction-pulley $p$, in combination with the disks $r$, having crank-pins 3, the connecting-links $s$, and spades L L', substantially as set forth.

5. The combination, with the spades and handles, of crank-pin disks in pairs, friction-pulleys for rotating the same, links connecting the studs of the disks with the shafts of the pulleys, bails or suspending devices, and a cross-bar or shaft to which the suspending device is attached for determining the downward movement of the spades, substantially as set forth.

Signed by me this 9th day of January, A. D. 1882.

ROY STONE.

Witnesses:
GEO. T. PINCKNEY,
WILLIAM G. MOTT.